United States Patent [19]
Brickner et al.

[11] Patent Number: 5,966,262
[45] Date of Patent: Oct. 12, 1999

[54] METHOD AND APPARATUS FOR HIGH DATA RATE DETECTION FOR THREE DIMENSIONAL 110 CHANNELS

[75] Inventors: Barret J. Brickner, Minneapolis; Jaekyun Moon, Plymouth; Bernardo Rub, Edina, all of Minn.

[73] Assignee: Regents of University of MN, Minnesota, Minn.

[21] Appl. No.: 08/829,642

[22] Filed: Mar. 31, 1997

[51] Int. Cl.$^6$ .................................................. G11B 5/035
[52] U.S. Cl. ............................ 360/65; 375/233; 375/340
[58] Field of Search ........................ 360/46, 65; 375/233, 375/340; 364/724.2; 708/323

[56] References Cited

U.S. PATENT DOCUMENTS

| | | | |
|---|---|---|---|
| 4,945,538 | 7/1990 | Patel | 371/43 |
| 4,985,902 | 1/1991 | Gurcan | 375/14 |
| 5,132,988 | 7/1992 | Fisher et al. | 375/14 |
| 5,136,593 | 8/1992 | Moon et al. | 371/43 |
| 5,282,216 | 1/1994 | Patel et al. | 371/43 |
| 5,327,440 | 7/1994 | Fredrickson et al. | 371/43 |
| 5,357,520 | 10/1994 | Arnett et al. | 371/21.2 |
| 5,370,863 | 12/1994 | Barney et al. | 424/49 |
| 5,430,661 | 7/1995 | Fisher et al. | 364/488 |
| 5,438,460 | 8/1995 | Coker et al. | 360/46 |
| 5,805,478 | 9/1998 | Kim | 364/724.2 |

OTHER PUBLICATIONS

Brickner, B., et al., "3D–110 Derivation of a Novel FDTS/DF t=2 MTR=2 Coded DFE–110 Channel", *Center for Micromagnetics and Information Technologies, U of M*, 1–7, (1996).

Brickner, B., et al., "A High Dimensional Signal Space Implementation of FDTS/DF", *IEE Transactions on Magnetics, 32*, 3941–3943, (1996).

Brickner, B., et al., "Architectures for 3D–110 Detection", *MINT Research Review*, 1–2, (1996).

Brickner, B., et al., "High Data Rate Detection for 3D–110 Channels", *IEE Transactions on Magnetics, 33*, 2806–2808, (1997).

Brickner, B., et al., "Two–Bit Wide 3D–110 Detection", *CDSLab Report No. BB–96–04, U of M*, 1–6, (1996).

(List continued on next page.)

*Primary Examiner*—Aristotelis M. Psitos
*Assistant Examiner*—Regina Y. Neal
*Attorney, Agent, or Firm*—Schwegman, Lundberg, Woessner, Kluth PA

[57] ABSTRACT

An information handling system, such as a magnetic disk drive, includes a data channel which has a method and apparatus for detecting binary symbols from a received signal occurring at high data rates. The data channel includes a detector that has two inputs. The detector has a first portion which determines a first estimate of a binary input. The second portion, operating in parallel with the first portion, determines two conditional estimates for a second binary input. The estimate for the second binary input is selected after the first estimate is determined. The first and second estimates for the first and second binary inputs are then output from the detector. Each of the first and second portions of the detector uses a three dimensional observation space with orthogonal coordinate axes. Each of three consecutive synchronous observation samples of the received signal corresponding unambiguously to an axis in the observation space. A decision feedback equalizer removes intersymbol interference terms associated with prior detector outputs. Each detector portion uses a plurality of linear classifiers to partition the observation space. The second and/or third sample of the equivalent channel response is constrained relative to the first for the purpose of simplifying the linear classifiers. Boolean logic functions to decide into which decision region of the observation space a sample maps into. Advantageously, the detector runs at a frequency that is half the frequency of the remaining portions of the read channel.

21 Claims, 11 Drawing Sheets

OTHER PUBLICATIONS

Kenney, J.G., et al., "Multi–Level Decision Feedback Equalization for Saturation Recording", *IEEE Transactions on Magnetics, 29*, 2160–2171, (1993).

Moon, J., "Signal Processing in Data Storage Systems", *IEEE Signal Processing* (*not in print*), 1–38, (1997).

Moon, J. et al., "Efficient Sequence Detection for Intersymbol Interference Channels with Run–Length Constraints", *IEEE Transactions on Communications, 42, 9,* 2654–2171, (1994).

Patel, A.M., "A New Digital Signal Processing Channel for Data Storage Products", *IEEE Transactions on Magnetics, 27, 6,* 4579–4584, (1991).

METHOD AND APPARATUS FOR HIGH DATA RATE DETECTION FOR THREE DIMENSIONAL 110 CHANNELS

RELATED APPLICATIONS

The present is related to an application entitled "METHOD AND APPARATUS FOR THREE DIMENSIONAL SEQUENCE ESTIMATION IN PARTIALLY CONSTRAINED BINARY CHANNELS" which is assigned to a common assignee and which is filed on a date even herewith. The related application is incorporated by reference in this application.

FIELD OF THE INVENTION

The present invention relates in general to information storage systems and in particular to a method and apparatus for implementing three-dimensional detection of binary signals in a constrained response magnetic recording system.

BACKGROUND OF THE INVENTION

Computers often include information storage systems having media on which data can be written and from which data can be read for later use. One form of information storage system is a disk drive. Disk drives use various types of media. One more common form is a drive unit incorporating one or more disks having a magnetic coating on the surface of the disk. Data is recorded in tracks which are subsections of the magnetic coating on the surface of the disk. Transducers are used to magnetize portions of the magnetic surface in a write operation. In digital magnetic recording systems, data are stored by writing a sequence of magnets with alternating polarity onto a medium using a write head (transducer). The binary ones and zeros of the stored data are represented either as the two possible magnetic polarities or the change or absence of change. Information is retrieved using a read head (transducer).

The read head and the write head are part of what is known as a data channel. The data channel handles data from a source, such as the computer, and writes it to a disk on a disk drive where it is stored for later retrieval. The data channel also handles reading individual magnetic transitions from the disk to retrieve that data previously stored. The data channel manipulates the readback signal produced by the read head (transducer) to produce a representation of the data previously stored. It should be noted that the read head and write head may be two separate transducers or may be a single transducer used for both reading and writing data.

The read head is configured such that a change in the polarity of the magnetization pattern results in a non-zero amplitude value in the transducer output. Because the read heads used in storage devices have a limited bandwidth, the response of the read transducer to a change in magnetization is a pulse with a non-zero width. Linear density is the number of bits of data that can be stored in a unit length of a track on the media. At linear densities of interest in present and future storage devices, the transition response pulse is sufficiently wide to add non-zero amplitude components to the signal in adjacent bit periods. This mechanism is known as intersymbol interference (ISI).

For reasons of convenience and practicality, the channel noise is assumed to be additive white Gaussian noise (AWGN). Gaussian or normal distributions are well known statistical models that accurately describe the thermal and electronics noise produced by the resistive component of the read transducer and the electronics of the preamplifier required to amplify the transducer output to usable levels. In terms of random variables, the term white indicates that observations of the random variable are uncorrelated; observations of a correlated random variable are said to be colored. Additive noise indicates that summing the noiseless signal $s(t)$ and noise $n(t)$ produces the received signal $r(t)=s(t)+n(t)$, which implies that the signal and noise are uncorrelated.

A detector is also part of the data channel. The detector is the portion of the read channel that determines if a particular bit has a value of "1", which indicates a magnetic polarity in a first direction, or a "0", which indicates a magnetic polarity in a second direction. In earlier recording systems, data bits were detected by making a sample-by-sample decisions with a peak detection circuit, which made necessary the use of runlength limited (RLL) codes. This type of detector is called a peak detector. In terms of ISI, the function of the ISI code was to guarantee a minimum spacing between transitions so that the ISI components from adjacent transitions did not reduce the amplitude of the present transition below the detection threshold. Unfortunately, this technique is inefficient because it ignores the information content in the adjacent samples.

A second general type of detector is known as a sequence detector. Sequence detectors take advantage of the ISI terms by examining adjacent samples before making a decision. The Viterbi algorithm (VA) is an efficient means for implementing the maximum likelihood sequence detector (MLSD) which chooses the sequence that most likely produced the received or read signal. The complexity of the VA detector increases exponentially as the number of ISI terms increases. One type of magnetic storage device in use today overcomes this limitation by shaping the channel to produce partial response signals that have a predetermined and limited number of ISI terms. After shaping the channel response, a Viterbi algorithm is used to perform a maximum likelihood sequence detection. This type of sequence detector is known as a Partial Response Maximum Likelihood (PRML) detector. PRML detectors are commonly used in current information storage systems, such as disk drives.

Another sequence detector is fixed delay tree search with decision feedback (FDTS/DF). The FDTS/DF sequence detector performs sequence detection over a finite number of samples, generally less than the number of ISI terms. The unused ISI terms are subtracted by means of a nonlinear filter structure known as a decision feedback equalizer, which matches the shape of the unused tail of the channel response. Although FDTS/DF does not perform as well as the VA detector, it can outperform PRML schemes at high linear densities because the channel does not need to be shaped into a partial response form. An additional benefit of FDTS/DF is that the delay between the detector input and the decision is fixed and equal to the number of additional samples used in the decision process, i.e., if a total of three observation samples are used, the detector delay is $\tau=2$.

Current channel detectors have shortcomings. One of the shortcomings is the ability to handle higher data rates which are demanded by computer manufacturers. In response to demand to increase data rate, there have been attempts to provide for higher data rate detectors. For example, one attempt for a higher data rate detector is the use of a PRML detector with multiple inputs. The problem with the resulting higher data rate channel is that its performance suffers when compared to an optimum detector. a complex detector with limited ability to perform at higher data rates.

There is a need for a high data rate detector for use in the read portion of the data channel. In addition, there is a need for a detector that can handle high data rates.

SUMMARY OF THE INVENTION

The present invention pertains to a data channel for detecting binary symbols from a received signal occurring at high data rates. A method and apparatus for a high data rate detector which has a first portion and a second portion. In a first preferred embodiment, the data channel includes a detector that has two inputs. The two inputs are pipelined into the detector. The detector has a first portion which determines a first estimate of a binary input. The second portion, operating in parallel with the first portion, determines two conditional estimates for a second binary input. The estimate for the second binary input is selected after the first estimate is determined. The first and second estimates for the first and second binary inputs are then output from the detector. Advantageously, the high data rate detector operates at half the clock speed of the data read channel in which the detector is used.

Each of the first and second portions of the high data rate detector uses a three dimensional observation space with orthogonal coordinate axes. Each of three consecutive synchronous observation samples of the received signal corresponding unambiguously to an axis in the observation space. A decision feedback equalizer removes intersymbol interference terms associated with prior detector outputs. Each detector portion uses a plurality of linear classifiers to partition the observation space.

Boolean logic functions on the first portion of the high data rate detector to decide into which decision region of the observation space a first sample maps into. Once this is determined, the estimate for the first estimate is used to select one of two conditional estimates for the second binary input that has been determined in parallel with the first estimate. The first and second estimates are then output from the detector.

In a first embodiment, there are two inputs to the detector. In a second embodiment, there are four inputs to the detector. Advantageously, the detectors described herein have increased performance at higher user bit densities when compared to a other sequence detectors. This and various other features as well as advantages which characterize the present invention will be apparent upon reading of the following detailed description and review of the associated drawings.

DESCRIPTION OF THE PREFERRED EMBODIMENTS

In the following detailed description of the preferred embodiment, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

Figure 1:
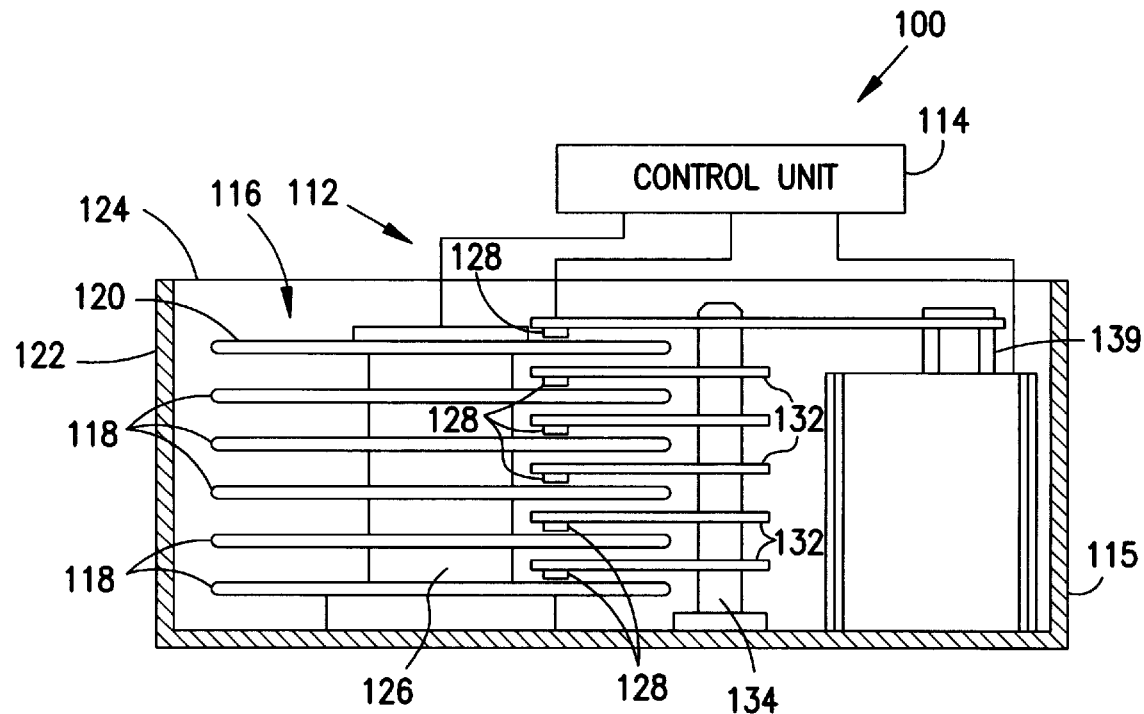
FIG. 1 is a schematic and block diagram of an information handling system embodying the present invention.

FIG. 1 is a schematic and block diagram of an information handling system embodying the present invention. An information handling system 100, includes a data storage medium 112 and interface control unit 114. In the preferred embodiments of this invention the data storage medium 112 comprises a rigid magnetic disk drive 115, although it should be readily understood that any other mechanically moving memory configuration may be used. The magnetic disk drive 115 is illustrated in simplified form sufficient for an understanding of the present invention. The utility of the present invention is not limited to the details of a particular information handling system or to the specific disk drive shown.

Figure 2:
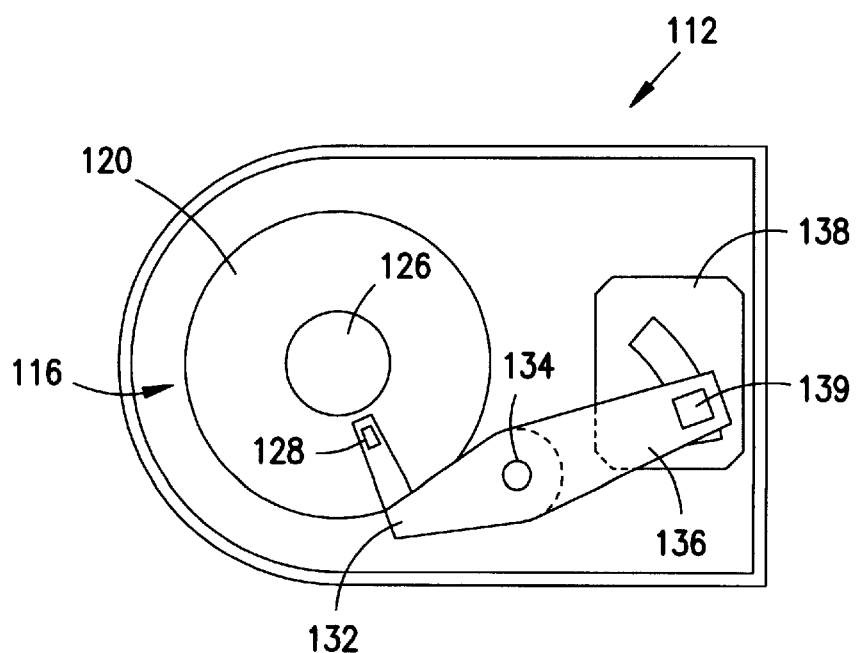
FIG. 2 is a top view of an information handling system embodying the present invention.

Now referring to both FIGS. 1 and 2 the disk drive 115 portion of the information handling system 100 will be detailed. FIGS. 1 and 2 show the principal electrical and mechanical components of a disk drive 115 constructed in accordance with a preferred embodiment of this invention. The disk drive 115 includes a head/disk assembly, which includes a base 122 and a cover 124. Attached to the base 122 is a spindle with an attached hub 126. Attached to the spindle with an attached hub 126 are a stack 116 of disks 118. It should be noted that some disk drives have a single disk and that this invention is equally applicable to a single disk version of a disk drive. The stack 116 of disks 118 includes at least one magnetic surface 120. Also attached to the base is a spindle motor (not shown) which rotates the spindle with an attached hub 126 and the disks 118 mounted to the hub 126. An actuator 134 includes arms 132 that carry transducers 128 in transducing relation to one of the disks. A portion of an actuator motor 139 is attached to the actuator 132 and positions one or more transducers 128 to different radial positions relative to one or more magnetic surfaces 120 of the disk 118.

Figure 3:
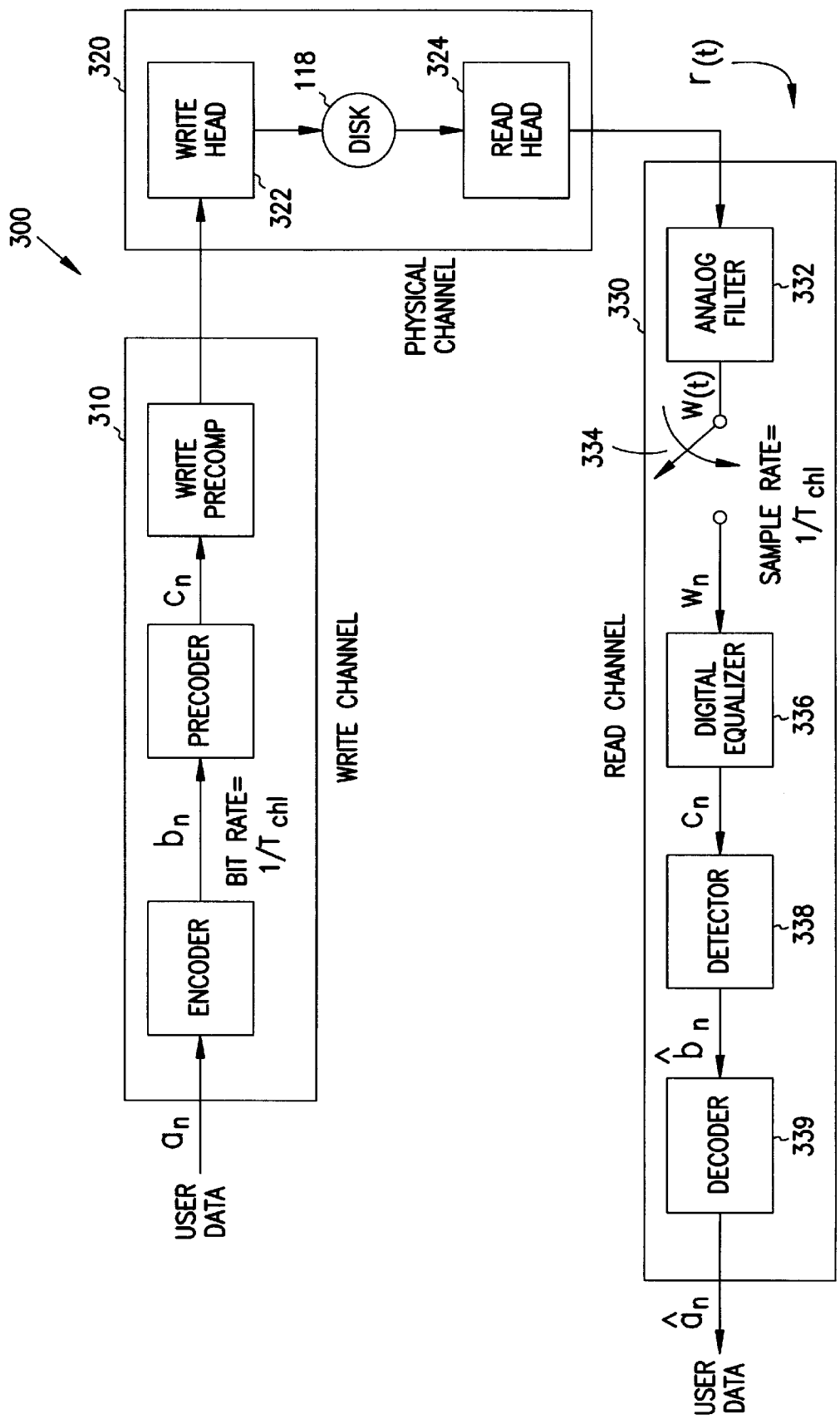
FIG. 3 is a schematic diagram of a data channel for use with the information handling system of FIGS. 1 and 2.

The disk drive 115 also includes a data channel 300. A schematic or block diagram of the data channel 300 is shown in FIG. 3. The data channel 300 includes a write channel 310, a physical channel 320 and a read channel 330. The write channel 310 includes an encoder 312, a precoder 314, and write precompensation circuitry 316. The encoder 312 and the precoder 344 implement a Maximum Transition Run ("MTR") code. The particular MTR code used limits the maximum number of consecutive transitions to 2. It should be noted that code used is not limited to an MTR code. The precompensation circuitry 316 changes the signal to be written to the disk so that it can be retrieved more easily from the disk by the read head and read channel 330. The physical channel 320 includes a write head 322, a disk 118, and a read head 324. The read head 324 and write head 320 are also known as transducers. In some instances, the read head and the write head may be the same transducer. The write head 322 includes a coil. When a write current is passed through the write head 322 in one direction, the magnetic surface of a disk 118 is magnetized in a first direction. When a write current is passed through the write head 322 in the opposite direction, the magnetic surface of a disk 118 is magnetized in a second direction. Normally, the disk 118 maintains its magnetized state until the area of the disk is rewritten or remagnetized. The read head 324 produces a signal based on the magnetized state of the disk 118 below the read head 324. The signal from the read head 324 is passed into the read channel 330.

The read channel 330 includes a filter 332, a sampler 334, an equalizer 336, a detector 338 and a decoder 339. The filter 332 filters out unwanted portions of the signal from the read head. Samples are taken at the sampler 334. The sampled signal is equalized at the equalizer 336. The output of the equalizer 336 is input to a detector 338 which estimates the value of various sampled portions. The output of the detector 338 is passed through a decoder 339 to produce the read back user data.

The input to the channel is a coded binary signal representing data to be stored or transmitted. In addition to compression and error correction codes often employed in communications and storage channels, a modulation code is typically employed to suppress unwanted patterns or to introduce certain desirable characteristics in the channel input data. For more information on general coding techniques used in data storage, see P. H. Siegel et al., "Modulation and coding for information storage," *IEEE Transactions on Communications*, December 1991, pp. 68–86. A specific code constraint that will be employed with the invention to yield a reduction in error rate is the maximum transition run (MTR) code described in J. Moon et al., "Maximum transition run coding for data storage systems," *IEEE Transactions on Magnetics*, September 1996, pp. 3992–3994. The MTR code with constraint j=2 limits the maximum number of consecutive transitions in the recorded data to two.

Figures 4, 5:
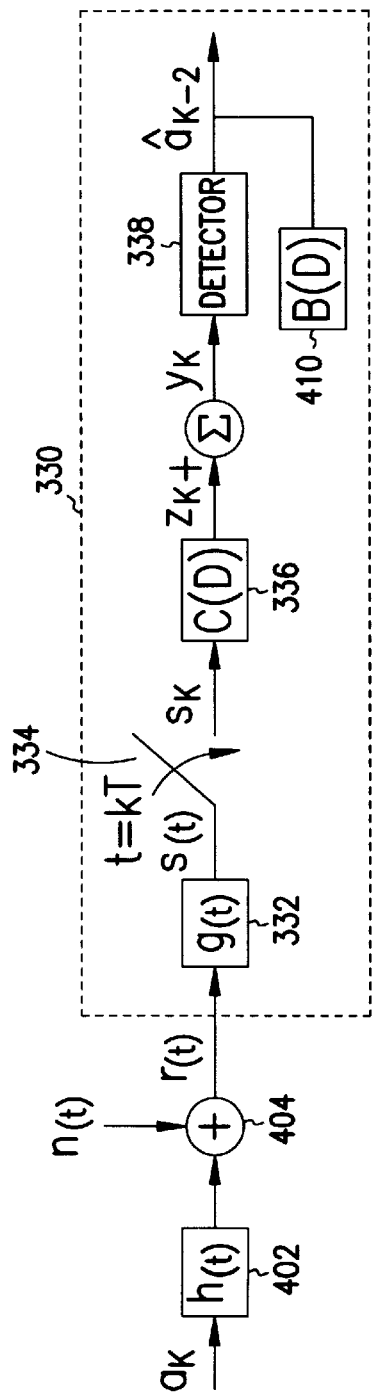
FIG. 4 is a schematic diagram of a read signal and some of the operations performed thereon according to the present invention.
FIG. 5 is a table showing all possible combinations of $\{a_k, a_{k-1}, a_{k-2}\}$, the symbol coordinates, in the observation space where past ISI terms have been removed and all possible combinations of $\{y, y_{k-1}, y'_{k-2}\}$, the set of observations.

FIG. 4 is a schematic diagram of a read signal and some of the operations performed thereon according to the present invention. Referring to FIG. 1, the modulated input signal $a_k$ is convolved with the channel response h(t), depicted by box 402, and combined with additive noise n(t), shown as adder 404, to produce a continuous time read signal r(t). Typically, the read signal is processed by a continuous time filter g(t), such as filter 332, to produce a bandlimited signal s(t) prior to sampling. The signal is sampled at constant or near constant time intervals T that are synchronous with input signal $a_k$. The sampling is done at sampler 334. Although timing recovery is necessary for the proper operation of the detector, it is not an explicit component of the invention. Discussions on timing recovery may be found in K. H. Mueller et al., "Timing recovery in digital synchronous systems," *IEEE Transactions on Communications*, pp. 516–531, May 1976. The effective channel response, which is the combined response of the channel and the receiver filters, is specified by some shaping constraint subject to a minimization of noise. Although this operation may be combined with g(t), it is generally performed by a separate, discrete time filter C(D), such as the equalizer 336 shown in FIG. 3. The result of filtering the synchronous samples $z_k$ with C(D) is $z_k$, which can be written as $$z_k = \sum_{i=0}^{l-1} f_i a_k + v_k \qquad (2)$$

where $\{f_i\}$ is the effective channel response and $v_k$ is the channel noise. The length of the effective response is l, which depends on the actual channel response h(t) and the filters. In a sampled data system, the component of the equalized channel response which multiplies the present input is referred to as the cursor term, and the samples which are multiplied by past inputs are referred to as the postcursor terms. Typically, the cursor term is the first non-zero component of the sampled equalized response. Although the precursor (future) terms may take non-zero values under some equalization design criteria, their magnitude is assumed to be negligibly small relative to the cursor term for practical systems of interest. When l>τ, a feedback filter B(D), depicted by reference number 410, is used to cancel the known postcursor ISI terms, yielding and observation $y_k$ that is a function of the unknown channel inputs and the filtered noise as indicated in (1). The postcursor ISI terms are removed at a summer 412 which is positioned before the detector 410. This implies when l<τ, a feedback filter B(D) is not required. Note that this implies the detector 338 is operating at high SNR (low error rate) so that the detector outputs are assumed to be correct.

The invention pertains to the detector block 338 and includes constraining of the channel response, which requires adjustment of the forward filters g(t), depicted by reference number 332, and C(D), depicted by reference number 336, and the feedback filter B(D), depicted by reference number 410. The detector block includes a signal space detector adjusted to suit the chosen channel constraint along with any applicable modulation code constraint.

Signal space detection employs an array of linear classifiers combined with a Boolean logic rule to form decision regions in an m-dimensional space. For the m=3 dimensional case relevant to the invention, the classifiers indicate on which side of a plane in the observation space the input lies. Under the assumption of additive white Gaussian noise, the plane is the locus of points equidistant from the two symbols to be differentiated. For two symbols $p=(p_0,p_1,p_2)$ and $q=(q_0,q_1,q_2)$ in the three dimensional space, the closest symbol to the set of observations $y_k=(y_k, y_{k-1}, y_{k-2})$ is determined using $$\gamma_k = sgn\{w_0 y_k + w_1(y_{k-1} - f_2 \hat{a}_{k-3}) + w_2(y_{k-2} - f_1 \hat{a}_{k-3} - f_2 \hat{a}_{k-4}) - \theta\} \qquad (3)$$

where $$w_i = 2\kappa(p_i - q_i) \qquad (4)$$

$$\theta = \kappa \sum_{i=0}^{2} (p_i^2 - q_i^2), \tag{5}$$

and κ is any real number greater than zero. The sign function sgn{·} produces a positive logic value when the argument is greater than or equal to zero and a negative logic value otherwise. Because this operation is only concerned with the argument's sign, any κ>0 is permissible. In the preferred embodiments, κ is adjusted to reduce the number of required gain terms by scaling one or more to unity.

A number of linear classifiers sufficient to partition the observation space into appropriate decision regions are operated in parallel. The outputs from the classifiers are combined by means of a Boolean logic circuit to form an output term $\hat{a}_{k-2}$ that is a maximum likelihood estimate of $a_{k-2}$ given $y_k$, the previous outputs, and the delay constraint that the decision be made prior to knowledge of The invention incorporates an equalization constraint that specifies $f_1$, $f_2$, or both relative to $f_0$. Although these terms could be fixed at any value, the preferred embodiments employ constraints the simplify the apparatus of the detector according to some criterion. Specific examples of useful criteria include the reduction of summing nodes, multipliers, sample storage elements, number of inputs to a circuit node, and number of outputs from a circuit node.

In accordance with the present invention, a signal space detector is formulated for the channel constraints $f_0=f_1$ and $f_2=0$. This constraint is described by the label DFE-110 which indicates that the first three samples of the normalized effective channel response are 1, 1, and 0, and any remaining terms are eliminated via decision feedback equalization. If there are no terms beyond 1, 1, 0 then no decision feedback is required. The apparatus of a three dimensional signal space detector incorporating this constraint is referred to as a 3D-110 detector.

Figure 6:
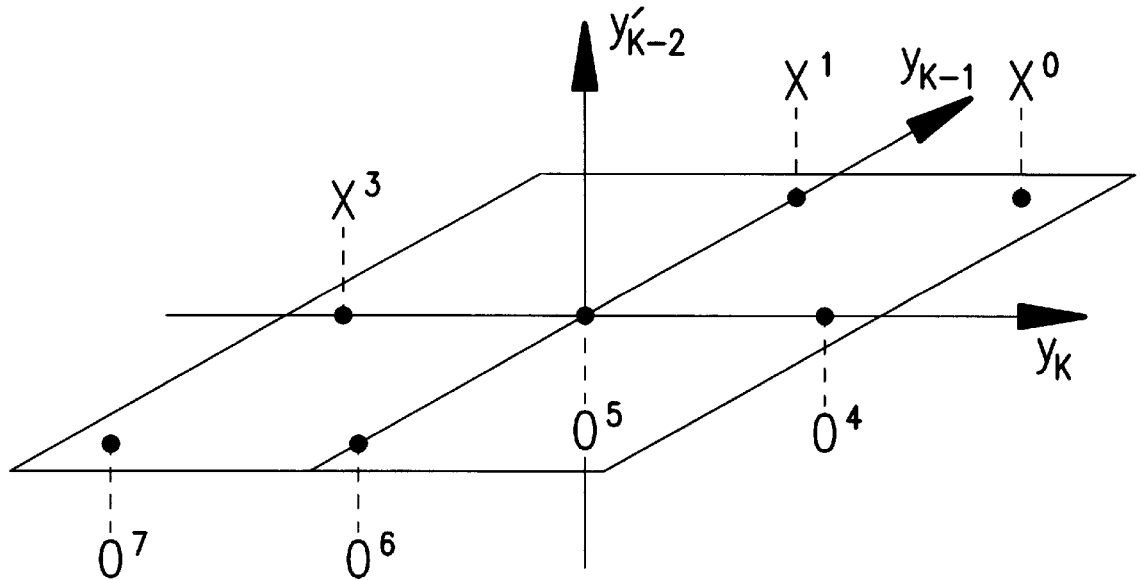
FIG. 6 is a graph of signal space showing all possible combinations of $\{a_k, a_{k-1}, a_{k-2}\}$, the symbol coordinates, where the 'X' symbols correspond to $a_{k-2}=1$ and the 'O' symbols to $a_{k-2}=-1$, and where the symbol labels correspond to the values of $\Psi$ in FIG. 5.
Figure 7:
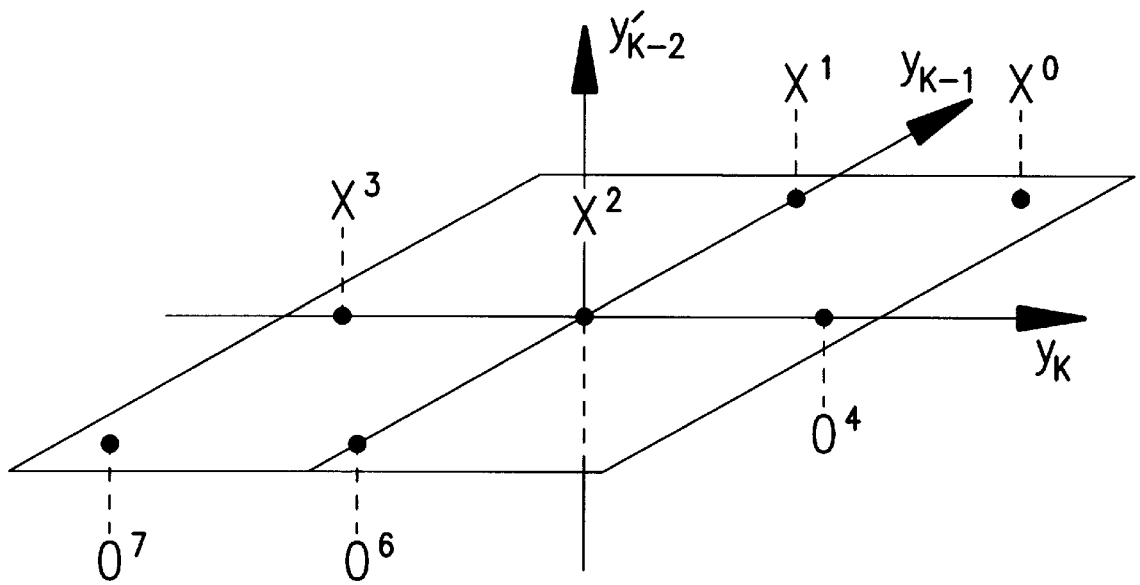
FIG. 7 is a graph of signal space showing all possible combinations of $\{a_k, a_{k-1}, a_{k-2}\}$, the symbol coordinates, assuming a previous decision of +1.

Now referring to FIGS. 5–9, the partitioning of the observation space with a number of linear classifiers into appropriate decision regions operating in parallel will be further detailed. Considering all possible combinations of $\{a_k, a_{k-1}, a_{k-2}\}$, the symbol coordinates in the observation space where past ISI terms have been removed are given in the table shown in FIG. 5. The resulting signal space is shown in FIG. 6, where the 'X' symbols correspond to $a_{k-2}=1$ and the 'O' symbols to $a_{k-2}=-1$, and where the symbol labels correspond to the values of Ψ in FIG. 2. In any case where $f_2=0$, removal of known ISI terms will not affect $y_{k-1}$, whereas $y_{k-2}=y_{k-2}-f_1\hat{a}_{k-3}$. In this constellation, the closest pair of symbols corresponding to different decisions are the symbols labeled 2 and 5, which are produced by the inputs $\{+1,-1,+1\}$ and $\{-1,+1,-1\}$, respectively. Because the detector performance will improve with an increase in the minimum distance between the two symbol sets, an MTR code is employed to give a distance gain. The maximum transition run parameter is selected to be j=2, which prohibits input sequences containing three or more consecutive transitions. Examination of symbols 2 and 5 indicate that for an input of −1, symbol 2 is invalid, and 5 is illegal if the input is +1. With the MTR j=2 code, the constellation assuming a previous decision of +1 is shown in FIG. 7. For the other input, symbol 2 would be absent with symbol 5 present. The quotient of the new distance to the old is √2, which yields a significant distance gain of 3 dB.

Figure 8:
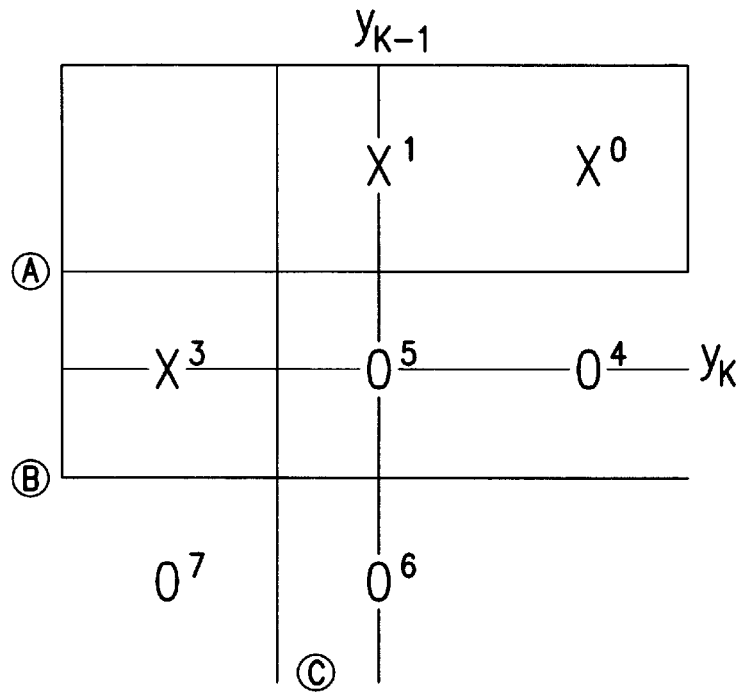
FIG. 8 is a graphical view of the relevant boundaries where $a_{k-3}=-1$.

The linear classifiers are chosen by considering all possible pairs of symbols, one of each from the two symbol sets corresponding to the binary input. This process will yield redundant boundaries which are removed. The signal space and relevant boundaries for the two possible inputs can be conveniently illustrated by rotating the three dimensional space so that the $y'_{k-2}$ axis is out of the plane of the paper toward the reader as shown in FIG. 8 for $a_{k-3}=-1$ and in FIG. 9 for $a_{k-3}=+1$. Assuming that κ is chosen to be 0.5 for the normalized channel response, the classifiers for the boundaries in FIGS. 8 and 9 are given by $$A = \text{sgn}\{y_{k-1} + y'_{k-2} - 1\} = \text{sgn}\{y_{k-1} + y_{k-2} - \hat{a}_{k-3} - 1\} \tag{6}$$
$$B = \text{sgn}\{y_{k-1} + y'_{k-2} + 1\} = \text{sgn}\{y_{k-1} + y_{k-2} - \hat{a}_{k-3} + 1\}$$
$$C = \text{sgn}\{-y_k + y'_{k-2} - 1\} = \text{sgn}\{-y_k + y_{k-2} - \hat{a}_{k-3} - 1\}$$
$$D = \text{sgn}\{-y_k + y'_{k-2} + 1\} = \text{sgn}\{-y_k + y_{k-2} - \hat{a}_{k-3} + 1\}.$$

Because boundary C is used only when $\hat{a}_{k-3}=-1$ and D is valid only when $a_{k-3}+1$, these two classifiers can be merged to give $$E = \text{sgn}\{-y_k + y_{k-2}\} \tag{7}$$

Figure 9:
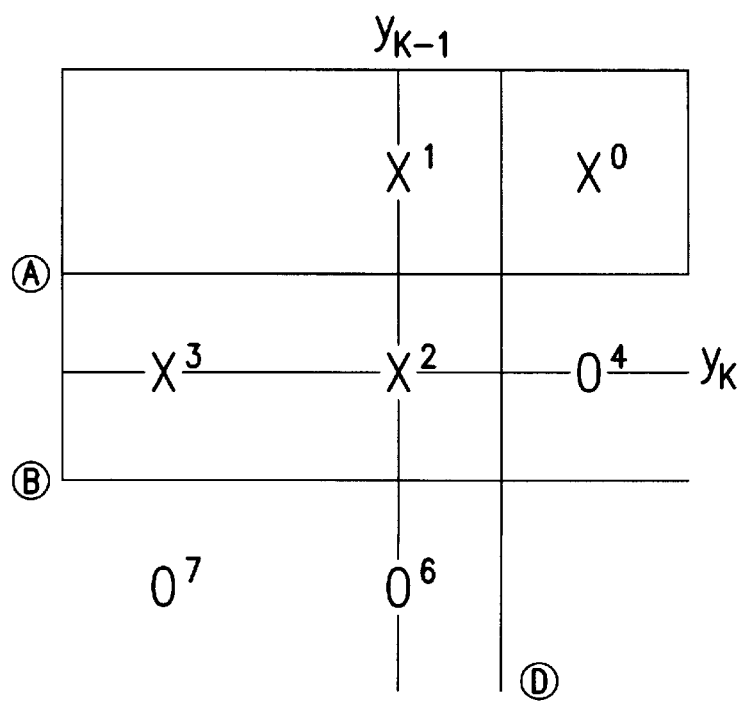
FIG. 9 is a graphical view of the relevant boundaries where $a_{k-3}=+1$.

The decision region is formed with the Boolean logic expression $$\hat{a}_{k-2} = A \vee (B \wedge E) \tag{8}$$

where the traditional binary Boolean logic set $\{0,1\}$ is equivalent to the set $\{-1,+1\}$ used for $\hat{a}_{k-2}$ FIGS. 8 and 9 show the boundaries A, B, C and D in signal space. The boundaries are depicted as lines labeled with the letter of the boundary in a circle referencing the boundary. The individual inputs from the table shown in FIG. 5 are labeled with the number corresponding to the Ψ value. As mentioned above, boundaries C and D can be merged to form boundary E.

Figure 10:
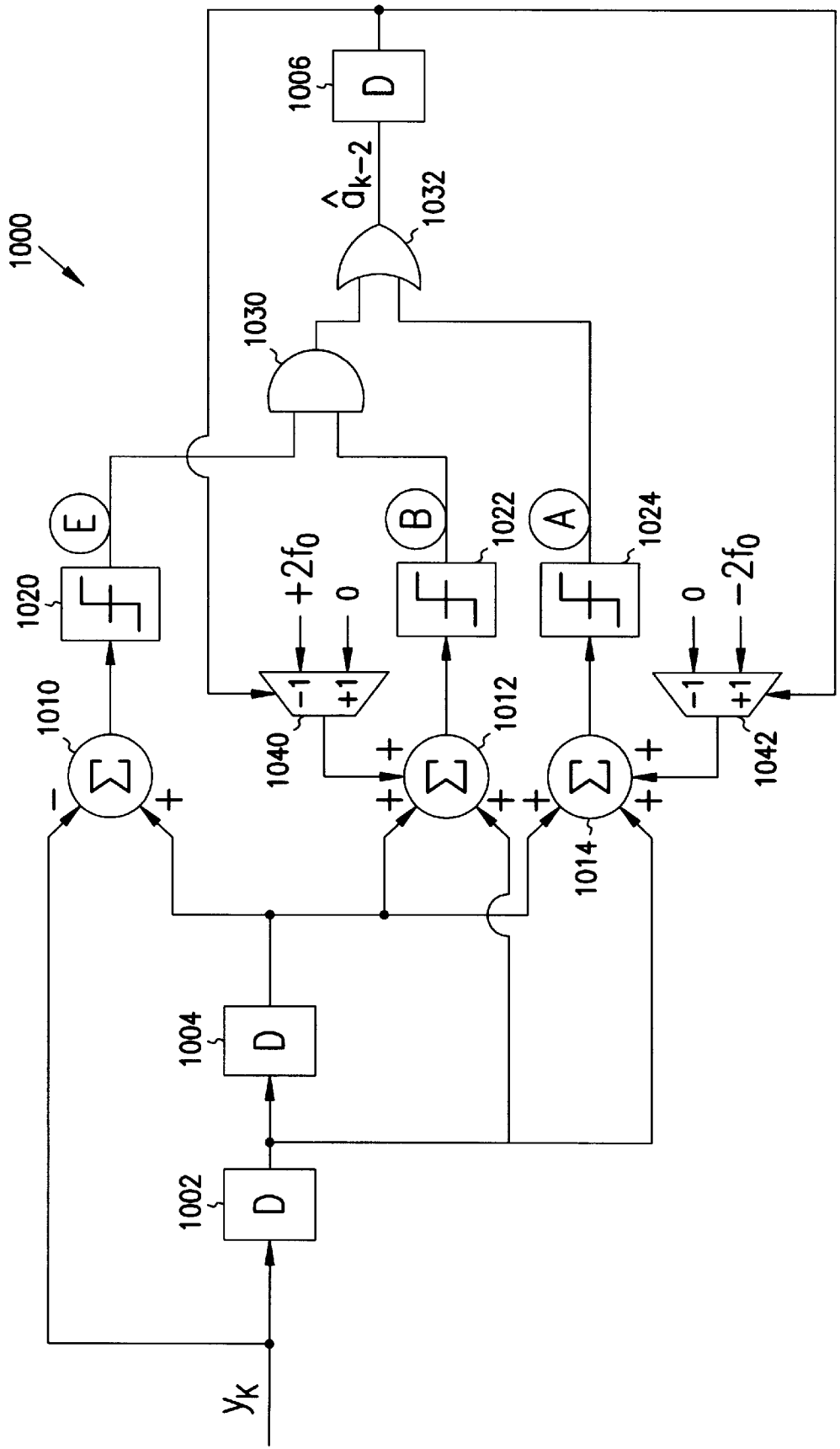
FIG. 10 is a one preferred embodiment of a detector apparatus for implementation of this invention.

FIG. 10 is a one preferred embodiment of a detector apparatus 1000 for implementation of this method of sequence detection. In the detector apparatus 1000, the multiplexer inputs are generalized for any κ>0. The detector apparatus 1000 includes two delay elements 1002 and 1004 which produce the terms $y_{k-1}$, and $y_{k-2}$. The detector apparatus 1000 also has three summing nodes, 1010, 1012, and 1014. The detector apparatus 1000 also has a first multiplexer 1040, and a second multiplexer 1042. The first multiplexer 1040 and the second multiplexer 1042 serve to eliminate one of the possible outputs for $\hat{a}_{k-2}$ and also removes an ISI term that is beyond the three used by the detector 1000. The possible output for $\hat{a}_{k-2}$ which can be eliminated is dependent on the value of $\hat{a}_{k-3}$. A third delay element 1006 is used to capture $\hat{a}_{k-3}$. The value of term $\hat{a}_{k-3}$ is used to eliminate one of the potential points in signal space as can be seen FIGS. 8 an d 9. The blocks to the right of the summing nodes 1010, 1012, and 1014 are single bit quantizers 1020, 1022, and 1024 that produce a positive logic value for an input greater or equal to zero and a negative logic value for an input less than zero. The outputs of the single bit quantizers 1020, 1022, and 1024 correspond to the linear classifiers E, B, and A. The classifier outputs are then placed through an AND logic gate 1030 and through an OR gate to determine the estimated value $a_{k-2}$ which is denoted $\hat{a}_{k-2}$. In some particular circuits, it may be advantageous to replace the addition of the negative threshold before the slicer with a comparator. That is, the operation $\gamma_k = \text{sgn}\{x_k - \theta\}$ where $x_k$ is the appropriate combination of observations, is replaced with the operation $$\gamma_k = \begin{cases} 1, \text{ if } x_k \geq \theta \\ 0, \text{ if } x_k < \theta \end{cases} \quad (9)$$

which describes a comparator with threshold $\theta$.

High Data Rate Detection for 3D-110 Channel

A series of speed-enhancing modifications to the sample rate 3D-110 detector are now presented. Because of the simplicity of the 3D-110 detector, it is possible to construct a high speed version that, although more complicated than the basic 3D-110 detector, is not excessively complex. The high data rate detector for a three dimensional 110 channel has two portions which operate in parallel. A first portion of the high data rate detector operates very nearly the same as the three dimensional 110 detector discussed above. A second portion of the high data rate detector, formulates two conditional decisions, one for each possible value of $\hat{a}_{k-3}$. The output of the second portion of the high data rate detector is dependent on the value of $\hat{a}_{k-3}$ from the first portion of the high data rate detector. The correct value of the two conditional decisions in the second portion of the high data rate detector is selected or chosen near the end of the decision period just after the decision for $\hat{a}_{k-3}$ is finalized by the first portion of the detector. Two decisions can be output from the high data rate detector can therefore be output from the detector. The detector, therefore, only has to operate at half the clock speed of the channel.

A parallel version suitable for an analog implementation allows the clock rate to be nearly doubled relative to the original detector. By factoring a 1+D term from the detector boundaries and including it in the equalization, the adders required for a digital VLSI approach could be eliminated. Regardless of the approach, noise correlation resulting from shaping the channel response were shown to be a dominant factor at low densities but a nonfactor for user densities of 2.5 bits/PW50 and higher. So while these methods do not offer an appreciable advantage at low densities, they are well suited to high density storage systems where a detector capable of FDTS/DF performance and high data rates is required.

High Data Rate Detection: Two-bit-wide detection

Figure 15:
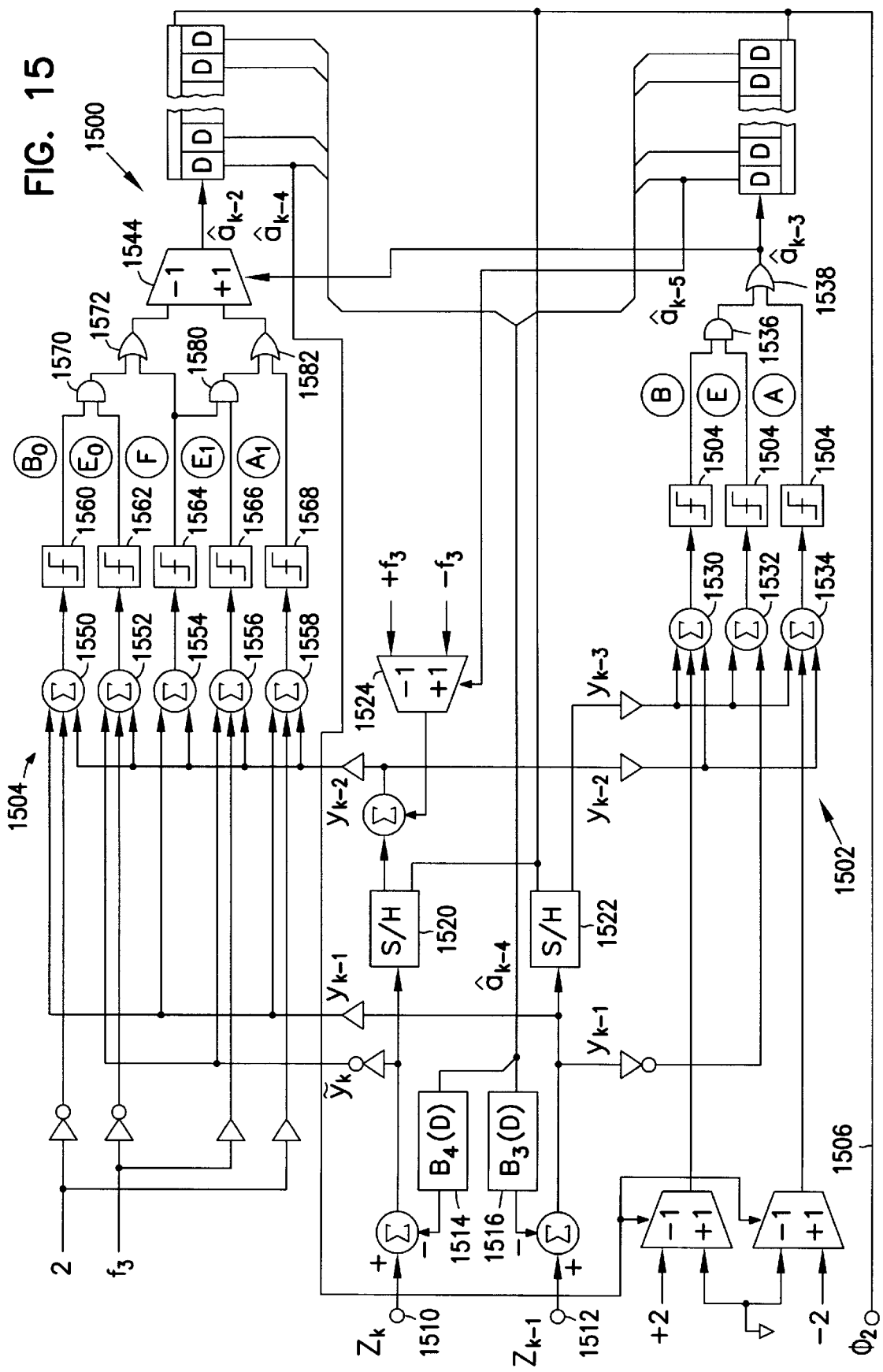
FIG. 15 is one preferred embodiment of a high data rate detector apparatus.

FIG. 15 shows a two input high data rate detector 1500. The simplicity of the basic sample-rate detector makes it feasible to construct a high speed version by duplicating the detector and feedback loop. Such a structure would release two decisions ($\hat{a}_{k-2}$ and $\hat{a}_{k-3}$) for every decision period and operate at half the system baud rate. The two input high data rate detector 1500 has a first portion 1502 and a second portion 1504. The first portion 1502 of the detector that determines $\hat{a}_{k-3}$ has the same form as the sample-rate detector 1000 (shown in FIG. 10), the other decision is a function of $\hat{a}_{k-3}$, which requires additional boundaries. The other decision is made in the second portion 1504 of the detector. The objective is to have two sets of boundaries for the second portion 1504 of the detector 1500, each conditioned on the two possible choices for $\hat{a}_{k-3}$ which is estimated in the first portion 1502 of the detector 1500. Using subscript 0 to denote the conditional value of $\hat{a}_{k-3}+1$, and using subscript 1 to denote the conditional value of $\hat{a}_{k-3}-1$, the required boundaries are $$A_0 = sgn\{y_{k-1}+y_{k-2}\}$$
$$A_1 = sgn\{y_{k-1}+y_{k-2}-2f_0\}$$
$$B_0 = sgn\{y_{k-1}+y_{k-2}+2f_0\} \quad (10)$$
$$B_1 = sgn\{y_{k-1}+y_{k-2}\}$$

$$E_0 = sgn\{-\tilde{y}_k+y_{k-2}-f_3\}$$
$$E_1 = sgn\{-\tilde{y}_k+y_{k-2}+f_3\}$$

where $\tilde{y}_1 = y_k + f_3 a_{k-3}$. The boundaries or linear classifiers are associated with certain lines in the second portion 1504 of the detector 1500. Note that $A_0$ and $B_1$ are the same so they can be replaced by a single equivalent boundary $F = A_0 = B_1$. The term $\tilde{y}_k$ exists because the top feedback filter, $B'(D) = B(D)-f_3$, does not have access to $\hat{a}_{k-1}$ until the next period. The clock signal 1506 and depicted as $\phi_2$ in FIG. 15 operates synchronously but at half the rate of the system clock. Although this circuit is more complex than the sample rate detector, more effort can be directed toward reducing power consumption at the expense of speed because the two-bit wide architecture will have nearly twice that data rate capability than the other.

The detector 1500 has two equalized inputs for samples. The first input 1510 is the input for $z_{k-1}$. The second input 1512 is the input for $z_{k-1}$. A first feedback filter 1514 removes any additional ISI terms beyond those selected for the sample size. In this case, the first feedback filter 1514 removes any additional samples beyond 3 to form an observation $v_k$. Similarly, a second feedback filter 1516 removes any additional samples beyond 3 to form observation $y_{k-1}$. If ISI terms beyond the observation sample size are not present, the feedback filters 1514 and 1516 are not needed. A first sample and hold 1520 is used to form observation $y_{k-2}$, and a second sample and hold 1522 is used to form observation $y_{k-3}$. Multiplexer 1524 serves to eliminate one of the possible outputs for $\hat{a}_{k-2}$ and also removes an ISI term that is beyond the three used by the detector 1500. The first portion 1502 of the detector 1500 also has three summing nodes, 1530, 1532, and 1534. The detector apparatus 1500 also has a second multiplexer 1540, and a third multiplexer 1542. The second multiplexer 1540 and the third multiplexer 1542 serve to eliminate one of the possible outputs for $\hat{a}_{k-3}$ and also removes an ISI term that is beyond the three used by the detector 1500. The blocks to the right of the summing nodes 1010, 1012, and 1014 are single bit quantizers 1530, 1532, and 1534 that produce a positive logic value for an input greater or equal to zero and a negative logic value for an input less than zero. The outputs of the single bit quantizers 1530, 1532, and 1534 correspond to the linear classifiers E, B, and A. The classifier outputs are then placed through an AND logic gate 1536 and through an OR gate 1538 to determine the estimated value $a_{k-3}$ which is denoted $\hat{a}_{k-3}$. The output of $\hat{a}_{k-3}$ from the first portion 1502 of the detector 1500 is input to a fourth multiplexer 1544 so that the proper value for $\hat{a}_{k-2}$ is selected.

The second portion 1504 of the detector 1500 includes summing nodes 1550, 1552, 1554, 1556 and 1558. Each of these summing nodes is a three input adder. Additional inputs for the value 2 and the value $f_3$ are added to the summing nodes to form the boundary conditions set forth in the boundary equations set forth as equations (13) above. The value of $f_0$ is assumed to be one in the equations for boundaries $A_1$ and $B_0$. Inverters are used to produce the subtracted values for $A_1$ and $E_0$. The blocks to the right of the summing nodes 1550, 1552, 1554, 1556 and 1558 are single bit quantizers 1560, 1562, 1564, 1566 and 1568 that produce a positive logic value for an input greater or equal to zero and a negative logic value for an input less than zero. The outputs of the single bit quantizers 1560, 1562, 1564, 1566 and 1568 correspond to the linear classifiers $B_0$, $E_0$, F, $E_1$, and $A_1$. Classifier outputs $B_0$, $E_0$, and F are then placed through an AND logic gate 1570 and through an OR gate 1572 to determine the first conditional estimated value $a_{k-2}$.

Classifier outputs F, $E_1$, and $A_1$ are then placed through an AND logic gate 1580 and through an OR gate 1582 to determine the second conditional estimated value $a_{k-2}$. The actual estimate denoted $\hat{a}_{k-2}$ is selected after multiplexer 1544 which receives the output $\hat{a}_{k-3}$ from the first portion 1502 of the detector 1500. The input $\hat{a}_{k-3}$ is the condition used to pick the proper value of $\hat{a}_{k-2}$.

High Data Rate Detection: Four-input, two-output detection

The cascading sample-and-hold stages as in the previous structures is unattractive because the analog signal will degrade as it moves along the delay line. This shortcoming can be eliminated if a single set of sampling stages are clocked in succession and the output directed to the appropriate detector input via a rotating switch matrix. With this assumption, the detector can be viewed as a block box receiving four consecutive equalized samples $z_k, \ldots, z_{k-3}$ and implementing a function that yields a pari of decisions $\hat{a}_{k-2}$ and $\hat{a}_{k-3}$. There are several possibilities for implementing the feedback filters. Two possible methods would be to: (1) use four RAM's to compute the feedback value and drive separate D/A convertors, or (2) to use D/A convertors for each feedback filter tap and route these terms, via multiplexers, to each of the four summing nodes.

Figure 16:
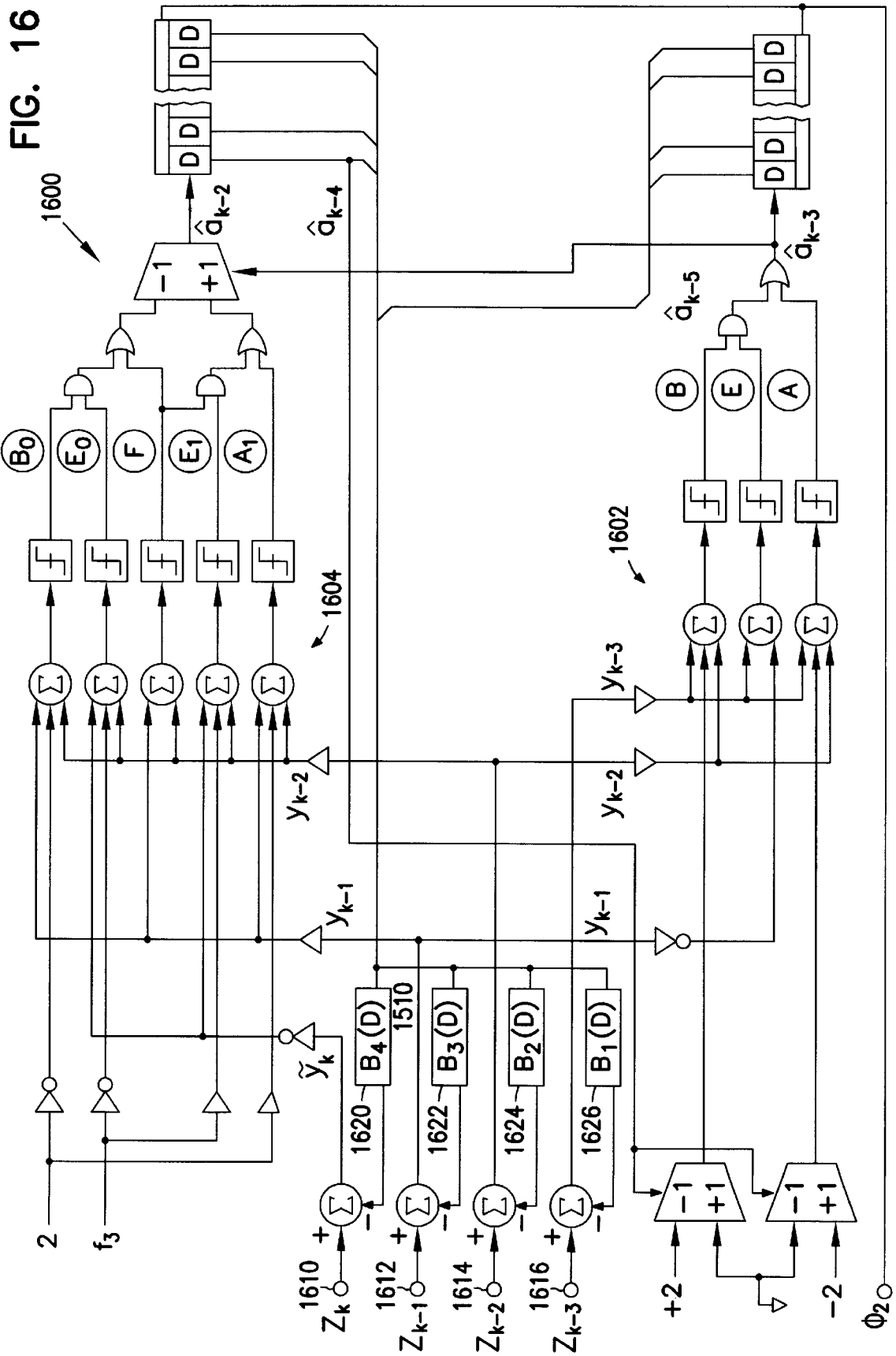
FIG. 16 is another preferred embodiment of a high data rate detector apparatus.

FIG. 16 shows a detector 1600 which has two portions 1602 and 1604. FIG. 16 differs from detector 1500 in that four equalized inputs 1610, 1612, 1614 and 1616, which correspond to $z_k, z_{k-1}, z_{k-2}$, and $z_{k-3}$ are used rather than two as is shown in FIG. 15. Thus, the delay signals come from the equalizers (not shown) rather than sample and hold circuits in the detector. A set of feedback filters 1620, 1622, 1624 and 1626, remove unwanted ISI terms from the samples $z_k, z_{k-1}, z_{k-2}$, and $z_{k-3}$ to form observations $y_k, y_{k-1}, y_{k-2}$, and $y_{k-3}$. These observations are then put through summers, single bit quantizers and logic in the same way as shown in FIG. 15 to yield the two estimates of $\hat{a}_{k-3}$ and $\hat{a}_{k-2}$. The hardware implementation for the first portion 1602 and the second portion 1604 are essentially the same and therefore will not be repeated here. The various elements of FIG. 16 also have not been renumbered since reference to FIG. 15 can be easily made.

Other High Data Rate Detectors: 1+D Factorization

Various delay factors could be added to the equalizer to produced equalized samples that would not require three input adders. The boundary conditions would change. Comparators could be used in lieu of the three input summing nodes and the single bit quantizers shown in FIGS. 15 and 16. This would produce a somewhat simpler and faster detector. Shown and described below are some alterations for simplified basic detectors. It is felt that these same types of modifications could be applied to modify the high data rate detectors 1500 and 1600.

Figure 11:
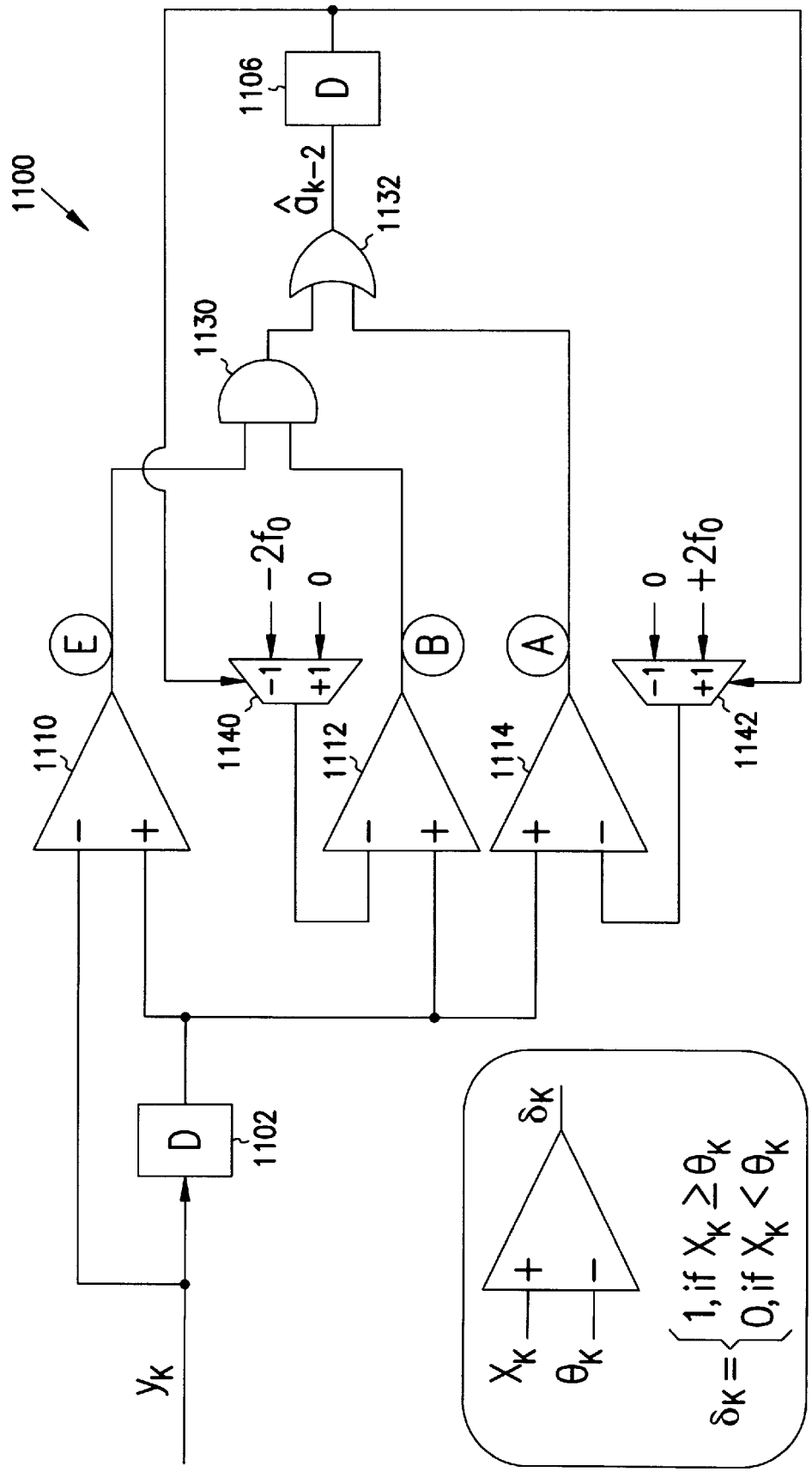
FIG. 11 is another preferred embodiment of a detector apparatus for implementation of this invention.
Figure 12:
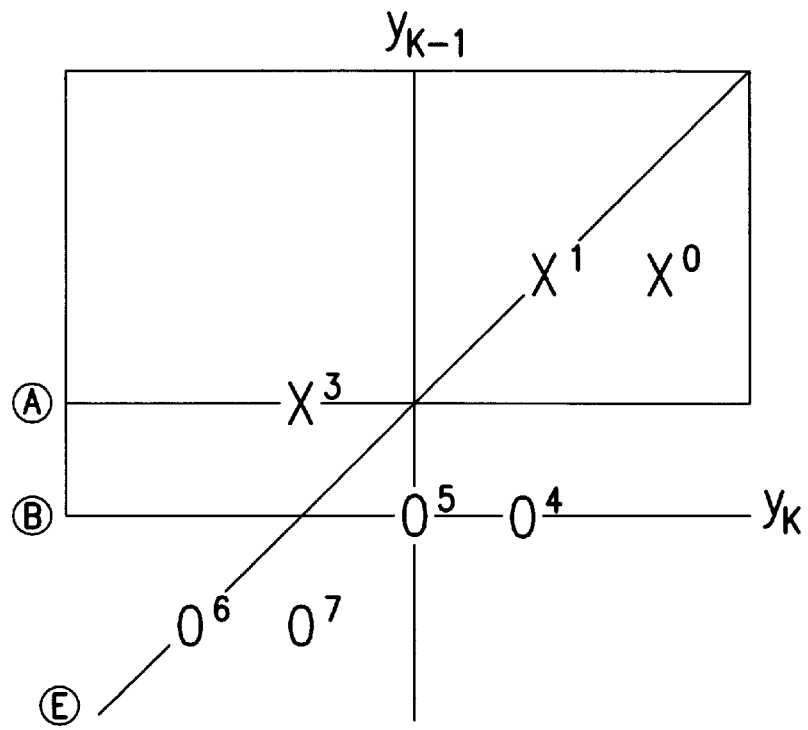
FIG. 12 is a graphical view of the relevant boundaries where $a_{k-3}=-1$ for the preferred embodiment of the invention shown in FIG. 11.
Figure 13:
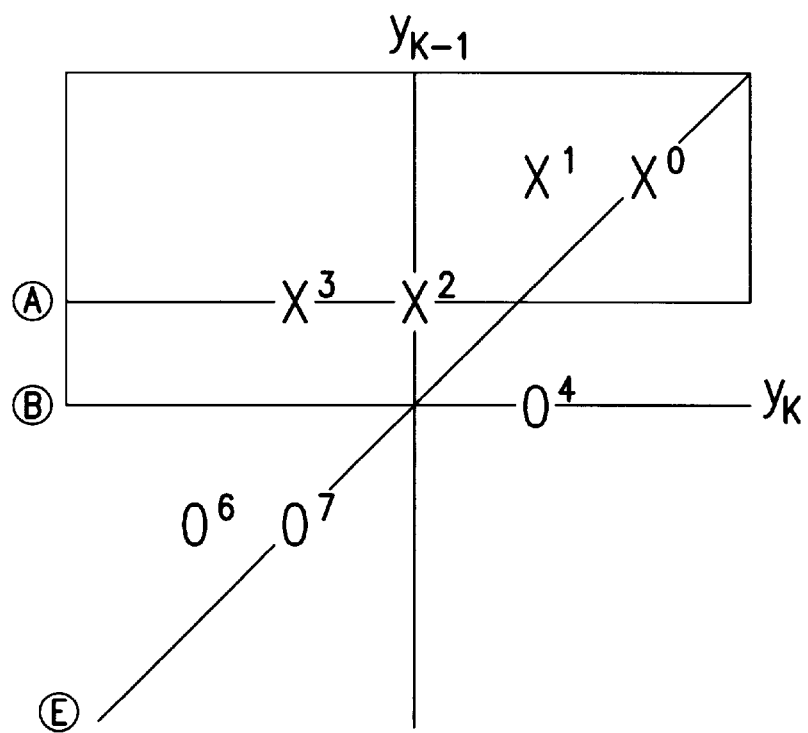
FIG. 13 is a graphical view of the relevant boundaries where $a_{k-3}=+1$ for the preferred embodiment of the invention shown in FIG. 11.

Turning now to FIGS. 11–13, another preferred embodiment of the invention will be discussed. Advantageously, in this other preferred embodiment of the present invention, the number of observation samples can be reduced with a corresponding reduction in the classifier complexity by projecting the three dimensional space onto two dimensions. The end result is simpler detector apparatus 1100 for the read data channel 330. In the previous embodiment of the 3D-110 detector, boundaries A and B both include the sum $y_{k-1}+y_{k-2}$. This operation can be performed with the equalizers by placing a 1+D filter in both the forward and feedback filters, which changes the observation to $$y_k = f_0 a_k + 2f_1 a_{k-1} + f_2 a_{k-2} + \hat{v}_k \quad (11)$$

where $\hat{v}_k$ is the noise term previously labeled $v_k$ colored by the 1+D filter. Design of the filters is performed subject to the constraint that the first three samples of the equivalent channel response normalized by the first non-zero sample are $\{1, 2, 1\}$. Rewriting the classifiers for the new observation produces $$A = sgn\{y_{k-1} - \hat{a}_{k-3} - 1\}$$

$$B = sgn\{y_{k-1} - \hat{a}_{k-3} - 1\} \quad (12)$$

$$E = sgn\{y_k - y_k\}$$

Because the transformation simply involves moving a portion of the classifier computation from the explicit classifier expression to the equalization blocks, the outputs from the modified classifiers are equivalent to those in the first embodiment and the Boolean logic of (8) may be used without modification.

A block diagram of an apparatus suitable for the implementation of the detection method outlined is illustrated in FIG. 11. The detector apparatus 1100 includes a delay element 1102 which holds the sample $y_{k-1}$ which is a necessary input to some of the elements of the detector apparatus. This preferred embodiment has advantages compared with the previous detector 1000 shown in FIG. 7 for both analog and digital circuit implementations. For the analog circuit, the number of internal delay (storage) elements required is reduced by one and the number of inputs to the summing nodes is reduced from a maximum of three to two. Since the number of inputs to the summing nodes is two, the summing node and slicer of the detector 1000 can be replaced with comparators 1110, 1112, and 1114. The output from the comparators 1110, 1112, and 1114 are the classifier outputs E, B, and A, respectively. The output of the comparators 1110, 1112, and 1114 is labeled with the linear classifier and corresponding boundary E, B, and A it represents. The classifier outputs are then placed through an AND logic gate 1130 and through an OR gate 1132 to determine the estimate of $a_{k-2}$ which is denoted $\hat{a}_{-2}$. For a digital circuit, a three input adder would be implemented with a cascade of two two-input adders. By moving the 1+D factor to the equalizers, this embodiment eliminates the need for one of these two adders. The equivalent comparator is substituted for the single remaining adder and slicer combination. The detector apparatus 1100 also has a first multiplexer 1140, and a second multiplexer 1142. The first multiplexer 1140 and the second multiplexer 1142 serve to add in the classifier constant and also removes an ISI term that is beyond the three used by the detector 1100. A second delay element 1106 is used to capture $\hat{a}_{k-3}$.

The symbols and boundaries on the two dimensional subspace are illustrated in FIG. 12 for $a_{k-3}=-1$ and in FIG. 13 for $a_{k-3}=+1$. Although this embodiment can be derived from the two dimensional subspace projection formed by the 1+D operation, the formulation is three dimensional in the context of the invention. Such equivalence results from the fact that the delay through the detector relative to the current observation sample remains three, with the detector using a three dimensional subspace formulation where the multipliers on the observation sample $y_{k-2}$ are selected to be zero. A true two dimensional formulation would produce an output $\hat{a}_{k-1}$ in response to $y_k$ and $y_{k-1}$. Therein lies the distinction between a two dimensional detector and the three dimensional detector embodied as a projection onto a lower dimensional subspace.

Figure 14:
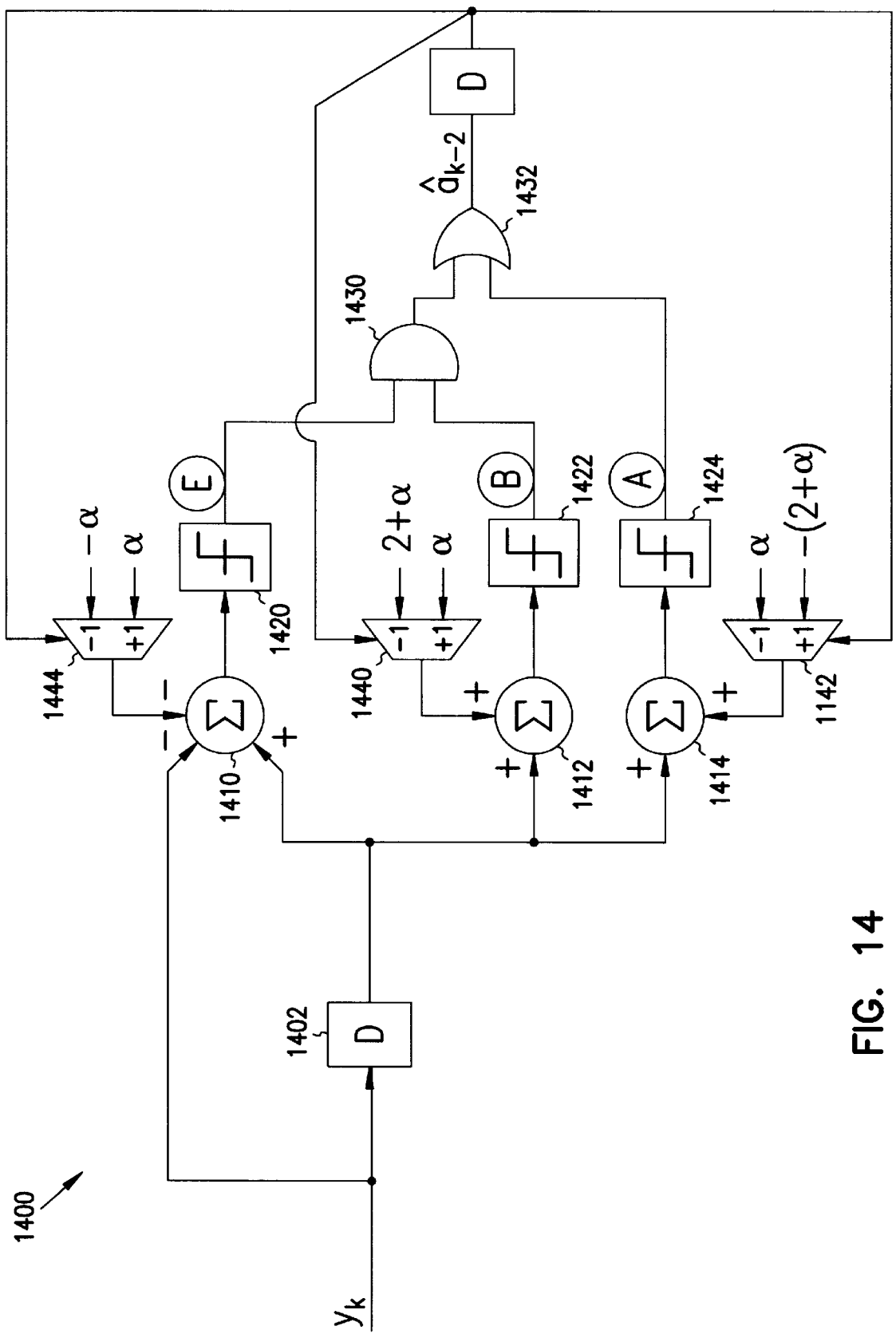
FIG. 14 is another preferred embodiment of a detector apparatus for implementation of this invention.

Another preferred embodiment of the present invention is shown in FIG. 14 as detector 1400. In detector 1400, the constraint is relaxed to $\{1, 1, \alpha\}$ so that the third value, $\alpha = f_2/f_0$, is unconstrained. Because the projection of the $\{1,$ 1, 0} constraint onto the two dimensional subspace yielded a simpler apparatus, the embodiment of this constraint is considered under the same transformation, i.e., the observation is $$y_k = f_0(a_k + 2a_{k-1} + (1+\alpha)a_{k-2}) + \hat{v}_k. \quad (12)$$

The block diagram of an apparatus for performing detection on the MTR j=2 constrained sequence equalized to {1, 1, α} is illustrated in FIG. 11. This embodiment is derived from the previous simply by subtracting the term $\alpha\hat{a}_{k-3}$ from the observation $y_{k-1}$. Note that the two are not identical; in the form considered here, the observation $y_k$ has an additional term $\alpha a_{k-2}$. However, this only affects classifier E because A and B use only $y_k$. For α<0, the additional term moves symbols away from boundary E, increasing distance and reducing the probability of error.

If the apparatus were to be implemented as a digital circuit, the three input addition for classifier E would increase the number of serial operations and reduce the maximum operating speed. For α<0, the removal of $\alpha\hat{a}_{k-3}$ from classifier E can be ignored, because the resulting loss of distance along the $y_k$ axis in signal space for certain combinations of symbols and $a_{k-3}$ is offset by the increase in distance along the $y_{k-1}$ axis. To accommodate situations where α would naturally be greater than a positive value, the filter design algorithm can be monitored and in the case where α>0, the design would be directed by the constraint α=0, thus constraining the channel to the DFE-110 response.

The detector apparatus 1400 includes two delay elements 1402 produce the terms $y_{k-1}$. The detector apparatus 1400 also has three summing nodes, 1410, 1412, and 1414. The detector apparatus 1400 also has a first multiplexer 1440, a second multiplexer 1442, and a third multiplexer 1444. The first multiplexer 1440, the second multiplexer 1442, and a third multiplexer 1444, remove an ISI terms corresponding to past decisions. The first multiplexer 1440, and the second multiplexer 1442 also add in the classifier constant. The possible output for $\hat{a}_{k-2}$ which can be eliminated is dependent on the value of $\hat{a}_{k-3}$. A second delay element 1406 is used to capture $\hat{a}_{k-3}$. The value of term $\hat{a}_{k-3}$ is used to eliminate one of the potential points in signal space. The blocks to the right of the summing nodes 1410, 1412, and 1414 are single bit quantizers 1420, 1422, and 1424 that produce a positive logic value for an input greater or equal to zero and a negative logic value for an input less than zero. The outputs of the single bit quantizers 1420, 1422, and 1424 correspond to the boundaries E, B, and A. The boundary conditions are then placed through an AND logic gate 1430 and through an OR gate 1432 to determine the estimated value $a_{k-2}$ which is denoted $\hat{a}_{k-2}$.

Although the present invention has been described with reference to preferred embodiments involving MTR j=2 constrained channels equalized to give equivalent channel responses where the first three samples with relative to the magnitude of the first are {1, 1, 0} and {1, 1, α} and where the observation space resulting from these constraints is projected onto a two dimensional subspace by factoring a 1+D term, persons skilled in the art will recognize that changes may be made in form and detail without departing from the spirit and scope of the invention.

In summary, this invention relates to a data channel apparatus for estimating binary input symbols received as a read signal from a data channel in an information storage system. The apparatus includes a read channel 330 and a detector 338. The detector 338 further comprises a first sample input, a second sample input, a first detector portion 1502 or 1602. The first detector portion 1502 or 1602 determines a first estimate of the first binary input based on the first sample input 1510, 1610. The apparatus also includes a second detector portion 1504 or 1604. The second detector portion 1504 or 1604 determines two conditional estimates of the second binary input 1512, 1612 based on the first sample input and on the second sample input, said second sample input occurring after the first sample input, said first detector portion 1502, 1602. The second detector portion 1504, 1604 works in parallel to determine the first estimate of the first binary input based on a first set of m consecutive samples. The two conditional estimates of the second binary input are based on a second set of m consecutive samples and one of said two conditional estimates selected on the basis of the determination of the first estimate.

The apparatus has two outputs. One of said outputs from element 1538 for the first estimate of the first binary input. The other of said outputs form 1544 for the second estimate of the second binary input. The clock of the detector 1500, 1600 runs at a clock 1506 speed which is half the clock speed of the read channel 330. The samples used by the first portion and the second portion have m−1 samples of said first set of m samples and said second set of m samples in common.

The apparatus includes an equalizer 336 for shaping the read signal samples subject to a constraint. A plurality of linear classifiers 1552, 1554, 1556, 1558, 1530, 1532, and 1534 partition an observation space into two decision regions corresponding to one of two binary input symbols. Logic elements 1570, 1572, 1580, 1582, 1536, and 1538 estimate into which of two decision regions a particular sample maps into. The apparatus also includes a feedback filter 1514, 1516 for removing intersymbol interference terms due to past estimates of the binary input symbols from the equalized read signal samples.

Another embodiment includes an information storage device 115, comprising a housing 122, 124, disks 118 rotatably attached to said housing 122, said disks having a surface capable of storing binary information, and a read channel 330 for reading stored binary information on the disks 118. The read channel includes a detector 1500, 1600 for estimating the binary input value of a selected sample. The detector further includes a first sample input, a second sample input, a first detector portion and a second detector portion. The first detector portion 1502, 1602 determines a first estimate of the first binary input 1510, 1610 based on the first sample input. The second detector portion 1504, 1604 determines two conditional estimates of the second binary input 1512, 1612 based on the first sample input and on the second sample input, said second sample input occurring after the first sample input. The first detector portion 1502, 1602 and the second detector portion 1504, 1604 work in parallel to determine the first estimate of the first binary input based on a first set of m consecutive samples, and the two conditional estimates of the second binary input based on a second set of m consecutive samples. One of said two conditional estimates selected on the basis of the determination of the first estimate. The information storage device uses m−1 samples of said first set of m samples and said second set of m samples which are identical. The information storage device of claim 7 further comprises two outputs, one of said outputs (form element 1538) for the first estimate of the first binary input, and the other of said outputs (form element 1544) for the second estimate of the second binary input. The detector 1500, 1600 runs at a clock 1506 speed which is half the clock speed of the read channel 330. The information storage device further comprises a sampler 334 for sampling the read signal, an equalizer 336 for shaping the read signal samples subject to a constraint, a plurality of linear classifiers 1552, 1554, 1556, 1558, 1530, 1532, and 1534 for partitioning an observation space into two decision regions corresponding to one of two binary input symbols, and logic elements 1570, 1572, 1580, 1582, 1536, and 1538 to estimate into which of two decision regions a particular sample maps into.

The information storage device also includes a feedback filter 1514, 1516, 1524 for removing intersymbol interference terms due to past estimates of the binary input symbols from the equalized read signal samples. The information storage device further comprises a write channel 310 for writing binary information onto the disks 118. The write channel includes an encoder (see FIG. 3) for implementing a maximum transition run code with a constraint limiting the maximum number of consecutive transitions in the recorded data to two.

Also described is a method for estimating binary input symbols received as a read signal from a data channel in an information storage system. The method comprises the steps of sampling 334 the read signal, equalizing 336 the read signal samples subject to a shaping constraint, inputting a first sample to a first detector portion 1502, 1602, inputting a first and second sample to a second detector portion 1504, 1604, determining a first estimate of the first binary input in the first detector portion, and determining in parallel with the step of determining a first estimate, two conditional estimates (form elements 1572 and 1582) of the second binary input. The first binary input based on a first set of m consecutive examples. The two conditional estimates (form elements 1572 and 1582) of the second binary input based on a second set of m consecutive examples in the a second detector portion. The second sample input occurs after the first sample input. One of said two conditional estimates is selected based on the determination of the first estimate (element 1544).

In the method, m−1 samples of said first set of m samples and said second set of m samples are identical. The method further includes the steps of forming an observation space using a fixed number, m, of consecutive equalized read signal samples, and partitioning the observation space with a plurality of boundaries 1552, 1554, 1556, 1558, 1530, 1532, and 1534 to form decision regions which map to one of two binary input symbols. The step of partitioning the observation space also includes the step of eliminating linear classifiers that are redundant. The method further includes removing intersymbol interference 1514, 1516, and 1524 terms due to past estimates of the binary input symbols from the equalized read signal samples. The method may also result in forming an observation space results in a three dimensional observation space. The step of equalizing 336 the read signal samples uses a shaping constraint in which at least one of the postcursor samples of the equalized channel response has a selected value relative to the cursor sample used to estimate the binary input. The equalizing 336 step may also include adding a factor of 1+D into the equalizing step.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the detector while maintaining substantially the same functionality without departing from the scope and spirit of the present invention. In addition, although the preferred embodiment described herein is directed to a detector for a information storage system, it will be appreciated by those skilled in the art that the teachings of the present invention can be applied to other systems, such as communications or other systems, without departing from the scope and spirit of the present invention. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A data channel apparatus for estimating binary input symbols received as a read signal from a data channel in an information storage system, said apparatus comprising:
a read channel; and
a detector further comprising:
a first sample input;
a second sample input;
a first detector portion which determines a first estimate of the first binary input based on the first sample input; and
a second detector portion which determines two conditional estimates of the second binary input based on the first sample input and on the second sample input, said second sample input occurring after the first sample input, said first detector portion and said second detector portion working in parallel to determine the first estimate of the first binary input based on a first set of m consecutive samples, and the two conditional estimates of the second binary input based on a second set of m consecutive samples, one of said two conditional estimates selected on the basis of the determination of the first estimate.

2. The apparatus of claim 1 further comprising two outputs, one of said outputs for the first estimate of the first binary input, and one of said outputs for the second estimate of the second binary input.

3. The apparatus of claim 2 wherein the detector runs at a clock speed which is half the clock speed of the read channel.

4. The apparatus of claim 1 wherein m−1 samples of said first set of m samples and said second set of m samples are identical.

5. The apparatus of claim 1 further comprising:
an equalizer for shaping the read signal samples subject to a constraint;
a plurality of linear classifiers for partitioning an observation space into two decision regions corresponding to one of two binary input symbols; and
logic elements to estimate into which of two decision regions a particular sample maps into.

6. The apparatus of claim 5 further comprising a feedback filter for removing intersymbol interference terms due to past estimates of the binary input symbols from the equalized read signal samples.

7. An information storage device, comprising:
a housing;
disks rotatably attached to said housing, said disks having a surface capable of storing binary information;
a read channel for reading stored binary information on the disks, said read channel including a detector for estimating the binary input value of a selected sample, said detector further comprising:

a first sample input;

a second sample input;

a first detector portion which determines a first estimate of the first binary input based on the first sample input; and a second detector portion which determines two conditional estimates of the second binary input based on the first sample input and on the second sample input, said second sample input occurring after the first sample input, said first detector portion and said second detector portion working in parallel to determine the first estimate of the first binary input based on a first set of m consecutive samples, and the two conditional estimates of the second binary input based on a second set of m consecutive samples, one of said two conditional estimates selected on the basis of the determination of the first estimate.

8. The apparatus of claim 7 wherein m−1 samples of said first set of m samples and said second set of m samples are identical.

9. The information storage device of claim 7 further comprising two outputs, one of said outputs for the first estimate of the first binary input, and one of said outputs for the second estimate of the second binary input.

10. The information storage device of claim 9 wherein the detector runs at a clock speed which is half the clock speed of the read channel.

11. The information storage device of claim 9 further comprising a sampler for sampling the read signal;

an equalizer for shaping the read signal samples subject to a constraint;

a plurality of linear classifiers for partitioning an observation space into two decision regions corresponding to one of two binary input symbols; and logic elements to estimate into which of two decision regions a particular sample maps into.

12. The information storage device of claim 11 further comprising a feedback filter for removing intersymbol interference terms due to past estimates of the binary input symbols from the equalized read signal samples.

13. The information storage device of claim 9 further comprising a write channel for writing binary information onto the disks, said write channel including an encoder for implementing a maximum transition run code with a constraint limiting the maximum number of consecutive transitions in the recorded data to two.

14. A method for estimating binary input symbols received as a read signal from a data channel in an information storage system, said method comprising the steps of:

sampling the read signal;

equalizing the read signal samples subject to a shaping constraint;

inputting a first sample to a first detector portion;

inputting a first and second sample to a second detector portion;

determining a first estimate of the first binary input in the first detector portion, said first binary input based on a first set of m consecutive examples; and determining in parallel with the step of determining a first estimate, two conditional estimates of the second binary input based on a second set of m consecutive examples in the a second detector portion, said second sample input occurring after the first sample input; and selecting one of said two conditional estimates based on the determination of the first estimate.

15. The method of claim 14 wherein m−1 samples of said first set of m samples and said second set of m samples are identical.

16. The method of claim 14 further comprising the steps of:

forming an observation space using a fixed number, m, of consecutive equalized read signal samples; and partitioning the observation space with a plurality of boundaries to form decision regions which map to one of two binary input symbols.

17. The method of claim 16, wherein the step of partitioning the observation space further comprises the step of eliminating linear classifiers that are redundant.

18. The method of claim 16, further comprising the step of removing intersymbol interference terms due to past estimates of the binary input symbols from the equalized read signal samples.

19. The method of claim 15, wherein the step of forming an observation space results in a 3 dimensional observation space.

20. The method of claim 14, wherein the step of equalizing the read signal samples uses a shaping constraint in which at least one of the postcursor samples of the equalized channel response has a selected value relative to the cursor sample used to estimate the binary input.

21. The method of claim 14, wherein the step of equalizing the read signal samples subject to a shaping constraint further comprising the step of adding a factor of 1+D into the equalizing step.

* * * * *

UNITED STATES PATENT AND TRADEMARK OFFICE
CERTIFICATE OF CORRECTION

| | |
|---|---|
| PATENT NO.: | 5,966,262 |
| DATED: | October 12, 1999 |
| INVENTOR(S): | Brickner et al. |

It is certified that error appears in the above-identified patent and that said Letters Patent is hereby corrected as shown below:

In the Face Page, in Inventors line, delete "Barret" and insert --Barrett--, therefore.

In the Face page, in Assignee line, delete "Regents of University of MN, Minnesota, Minn." and insert --Regents of the University of Minnesota, Minneapolis, Minn.--, therefore.

In column 7, line 19, delete "of The" and insert -- of $Y_{k+1}$.
                                         The--, therefore.

In column 18, line 15, claim 14, delete "the" before "a second".

Signed and Sealed this

Twenty-ninth Day of May, 2001

*Attest:*

NICHOLAS P. GODICI

*Attesting Officer*     Acting Director of the United States Patent and Trademark Office